(12) United States Patent
Li et al.

(10) Patent No.: US 10,169,990 B2
(45) Date of Patent: Jan. 1, 2019

(54) METHOD AND SYSTEM FOR DISTRIBUTED REDUNDANCY CONTROL ON INTELLIGENT TRAFFIC NETWORK

(71) Applicant: KYLAND TECHNOLOGY CO., LTD., Beijing (CN)

(72) Inventors: Ping Li, Beijing (CN); Jianfeng Zhang, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/315,950

(22) PCT Filed: Feb. 15, 2016

(86) PCT No.: PCT/CN2016/073825
§ 371 (c)(1),
(2) Date: Dec. 2, 2016

(87) PCT Pub. No.: WO2016/127950
PCT Pub. Date: Aug. 18, 2016

(65) Prior Publication Data
US 2018/0144627 A1    May 24, 2018

(30) Foreign Application Priority Data
Feb. 15, 2015   (CN) .......................... 2015 1 0081956

(51) Int. Cl.
*G08G 1/081*    (2006.01)
*G08G 1/01*    (2006.01)
(Continued)

(52) U.S. Cl.
CPC ........... *G08G 1/081* (2013.01); *G08G 1/0145* (2013.01); *G08G 1/095* (2013.01); *H04L 67/125* (2013.01)

(58) Field of Classification Search
CPC ............ G08G 1/07; G08G 1/08; G08G 1/081; G08G 1/083; G08G 1/095
(Continued)

(56) References Cited

U.S. PATENT DOCUMENTS 3,754,209 A    8/1973  Molloy et al.
6,617,981 B2 *  9/2003  Basinger ................ G08G 1/081
                                                          340/907

(Continued)

FOREIGN PATENT DOCUMENTS

EP          1830332 A2    9/2007
JP       2006-526932 A   11/2006

*Primary Examiner* — Eric M Blount
(74) *Attorney, Agent, or Firm* — Arent Fox LLP

(57) ABSTRACT

Disclosed are a method and system for distributed redundancy control on an intelligent traffic network, the method includes: sending, by each communication control node, messages for electing a primary device to the other communication control nodes, and electing a primary device from the plurality of communication control nodes according to preset priorities of the communication control nodes, and backing up data of the communication control node in the primary device; and sending state detection messages to the other communication control nodes, if a response message of the communication control node to the state detection message indicates that the communication control node cannot control any action of a device served by the communication control node, controlling action of the device served by the communication control node, and adjusting control intervals of time of signaling lamps at junctions corresponding to the communication control nodes in a redundant network according to traffic flows.

10 Claims, 6 Drawing Sheets

(51) Int. Cl.
*G08G 1/095* (2006.01)
*H04L 29/08* (2006.01)

(58) Field of Classification Search
USPC ......... 340/909, 910, 912, 914, 915; 701/117
See application file for complete search history.

(56) References Cited

U.S. PATENT DOCUMENTS

| | | | |
|---|---|---|---|
| 8,554,456 B2 * | 10/2013 | Brant | G08G 1/083 |
| | | | 701/117 |
| 2005/0262216 A1 | 11/2005 | Kashiwabara et al. | |

* cited by examiner

--Prior Art--

METHOD AND SYSTEM FOR DISTRIBUTED REDUNDANCY CONTROL ON INTELLIGENT TRAFFIC NETWORK

CROSS-REFERENCE TO RELATED APPLICATIONS

This application is a National Stage of International Application No. PCT/CN2016/073825, filed on Feb. 15, 2016, which claims the benefit of Chinese Patent Application No. 201510081956.3, filed on Feb. 15, 2015, both of which are hereby incorporated by reference in their entireties.

FIELD

The present invention relates to the field of intelligent traffic technologies, and particularly to a method and system for distributed redundancy control on an intelligent traffic network.

BACKGROUND

In an intelligent traffic network, Global Positioning System (GPS) positioning, public traffic scheduling and stop announcement, supervision, and other post-digital network data are playing an increasingly important role in our life in reality, and 3G supervision, GPS public traffic scheduling, an Intelligent Transport System (ITS), and other systems have been deployed in a number of cities, so an important issue to be addressed next is how to manage these systems over a network.

Taking a signaling lamp to be controlled as an example, FIG. 1 illustrates a structural diagram of an existing intelligent traffic network which generally includes a station-level (city-level) control center, a junction switch, and a control device for signaling lamp. If a video camera at a junction detects an increase in traffic flow in some direction, then typically a traffic policeman will be instructed to adjust a signaling lamp manually on the spot to direct the traffic manually; or more typically the signaling lamp can be adjusted remotely and manually through the station-level control center to greatly improve the instantaneity for directing the traffic. However as there is a growing demand for transmission between the station-level control center and the junction switch, if the signaling lamp control device fails, then signal control communication between the station-level control center, and the signaling lamp control device on the spot may become abnormal, and this real issue needs to be addressed in redundant management of intelligent traffic.

Furthermore if there is unsmooth communication between the station-level (city-level) control center and the junction switch, then the data may not be transmitted in a timely and efficient manner, so that the issue of how to transmit backup data in a timely and efficient manner to the station-level (city-level) control center also needs to be addressed in redundant management.

Moreover an operating period of time of the existing signaling lamp is typically controlled and adjusted manually, and in order for convenient control, a related control device is generally placed at a turn of a junction, so that a passerby may also enable the related control device for operation, thus resulting in a significant hidden risk, which cannot be addressed simply by locking the related control device.

SUMMARY

In view of the problems above, the invention has been made to provide a method and system for distributed redundancy control on an intelligent traffic network so as to overcome or at least partially address the problems above.

Some embodiments of the invention provide a method for distributed redundancy control on an intelligent traffic network including an intelligent traffic control center, and a plurality of communication control nodes constituting a redundant network, the method including:

sending, by the communication control nodes, messages for electing a primary device to the other communication control nodes, electing a primary device according to the priorities of the communication control nodes, and backing up their own data in the primary device, that is, for each communication control node, sending, by the communication control node, the messages for electing a primary device to the other communication control nodes than the communication control node among the plurality of communication control nodes, and electing a primary device from the plurality of communication control nodes according to the preset priorities of the communication control nodes, and backing up the data of the communication control node in the primary device; and sending, by the primary device, state detection messages to the communication control nodes, that is, sending, by the primary device, the state detection messages to the other communication control nodes than the primary device among the plurality of communication control nodes; and when a response message to the state detection message is that a communication control node cannot control any action of a device served by the communication control node, then taking, by the primary device, the place of the communication control node to control the action of the device served by the communication control node, and adjusting, by the primary device, control intervals of time of signaling lamps at respective junctions in the redundant network according to traffic flows at the respective junctions, that is, for each of the other communication control nodes than the primary device among the plurality of communication control nodes, when a response message of the communication control node to the state detection message indicates that the communication control node cannot control any action of a device served by the communication control node, then controlling the action of the device served by the communication control node, and adjusting, by the primary device, control intervals of time of signaling lamps at junctions corresponding to the respective communication control nodes in the redundant network according to traffic flows at the corresponding junctions; and if the response message to the state detection message is a message for electing a primary device, then control, by the communication control node sending the response message which is the message for electing a primary device, again the action of the device served by the communication control node, and further back up its own data in the primary device, that is, for each of the other communication control nodes than the primary device among the plurality of communication control nodes, if the response message of the communication control node to the state detection message is a message for electing a primary device, then instructing the communication control node to control again the action of the device served by the communication control node, and further backing up the data of the communication control node in the primary device.

Furthermore electing, by the communication control nodes, the primary device according to the priorities of the communication control nodes, that is, the electing the primary device from the plurality of communication control nodes according to the preset priorities of the communication control nodes includes:

sending, by the communication control nodes, the messages for electing a primary device to the other communication control nodes, and electing the primary device according to manually set flags and traffic transmission states of communication control node the priorities of the communication control nodes in the messages for electing a primary device, that is, electing the primary device from the plurality of communication control nodes according to the manually set flags and the traffic transmission states of communication control node in the preset priorities of the communication control nodes in the messages for electing a primary device;

wherein electing the primary device from the plurality of communication control nodes includes:

electing a communication control node as a primary device when the manually set flag thereof is 1, that is, when there is a manually set flag of 1 in the priority of one of the communication control nodes, then electing the one communication control node as a primary device; and when all the manually set flags are 0, then sending, by the communication control node in the redundant network, state messages of communication control node to the other communication control nodes in the redundant network, and electing as a primary device a switching device of such a communication control node that there is the lowest communication traffic between the intelligent traffic control center and the communication control node, that is, if all the manually set flags in the priorities of the respective communication control nodes are 0, then sending, by the communication control node, state messages of communication control node including a traffic transmission state of the communication control node to the other communication control nodes than the communication control node among the plurality of communication control nodes, and electing as a primary device such a communication control node that there is the lowest communication traffic between the communication control node and the intelligent traffic control center; wherein the state messages of communication control node includes a traffic transmission state of communication control node.

Furthermore when the response message to the state detection message indicates that the communication control node cannot control any action of the device served by the communication control node, then taking, by the primary device, the place of the communication control node to control the action of the device served by the communication control node, and adjusting, by the primary device, the control intervals of time of the signaling lamps at the respective junctions in the redundant network according to the traffic flows at the respective junctions, that is, adjusting, by the primary device, the control intervals of time of the signaling lamps at the junctions corresponding to the respective communication control nodes in the redundant network according to the traffic flows at the corresponding junctions comprises:

sending, by the primary device, request messages of junction traffic flow to the communication control nodes, receiving response messages including the junction traffic flows of the communication control nodes, and receiving the junction traffic flow information at the respective nodes in the response messages, that is, sending, by the primary device, the request messages of junction traffic flow to the other communication control nodes than the primary device among the plurality of communication control nodes, and receiving the response messages including the junction traffic flows of the communication control nodes, wherein each communication control node returns the response message to the request message of junction traffic flow to the primary device; and shortening or lengthening, by the primary device, the control intervals of time of the signaling lamps at the respective junctions according to the junction traffic flow conditions upon reception of such junction traffic flows of the communication control nodes that are above a junction traffic flow threshold, that is, for each of the other communication control nodes than the primary device among the plurality of communication control nodes, shortening or lengthening, by the primary device, the control interval of time of the signaling lamp at the junction corresponding to the communication control node according to a junction traffic flow condition corresponding to the communication control node upon reception of such a junction traffic flow in the response message returned by the communication control node that is above a junction traffic flow threshold corresponding to the communication control node.

Furthermore the method further includes:

backing up, by the communication control nodes, their own data in their adjacent communication control nodes, and when the response messages to the state detection messages indicate that the communication control nodes cannot transmit all the data in the uplink, then transmitting, by the adjacent communication control nodes, their backup data in the uplink, wherein the data include all data stored in the communication control nodes, that is, for each communication control node, backing up, by the communication control node, the data of the communication control node in an adjacent communication control node; and instructing, by the primary device, the adjacent communication control node to transmit the backup data of the communication control node in the uplink, upon determining that the response message of the communication control node to the state detection message is that the communication control node cannot transmit all the data in the uplink, wherein the data include all data stored in the communication control node.

Furthermore when the response messages to the state detection messages indicate that the communication control nodes cannot transmit all the data in the uplink, then transmitting, by the adjacent communication control nodes, their backup data in the uplink, that is, instructing, by the primary device, the adjacent communication control node to transmit the backup data of the communication control node in the uplink, upon determining that the response message of the communication control node to the state detection message is that the communication control node cannot transmit all the data in the uplink comprises:

sending, by the primary device, request messages of data uplink transmission to the intelligent traffic control center and the communication control node;

when the primary device does not received any response message of the intelligent traffic control center to the request message of data uplink transmission in a predetermined period of time, then sending, by the primary device, a request messages of backup data uplink transmission to the adjacent communication control node of the communication control node, and transmitting, by the adjacent communication control node, the backup data stored by the adjacent communication control node to the intelligent traffic control center in the uplink, and sending a response message to the request messages of backup data uplink transmission to the primary device after completing uplink transmission, that is, when the primary device does not received any response message of the intelligent traffic control center to the request message of data uplink transmission in the predetermined period of time, then sending the request messages of backup data uplink transmission to the adjacent communication control node; and transmitting, by the adjacent communication control node, the stored backup data to the intelligent traffic control center in the uplink, and sending the response message to the request messages of backup data uplink transmission to the primary device after completing uplink transmission; and if the primary device receives the response message of the intelligent traffic control center to the request message of data uplink transmission in a predetermined period of time, then transmitting, by the communication control node, its own data to the intelligent traffic control center in the uplink, that is, instructing, by the primary device, the communication control node to transmit the backup data of the communication control node to the intelligent traffic control center in the uplink, upon reception of a response message of the intelligent traffic control center to the request message of data uplink transmission in the predetermined period of time.

Some embodiments of the invention provides a system for distributed redundancy control on an intelligent traffic network including an intelligent traffic control center, and a plurality of communication control nodes constituting a redundant network, the system includes:

a distributed control device configured to constitute a redundant network from the plurality of communication control nodes;

devices for electing primary device and data backup each configured to send messages for electing a primary device to the other communication control nodes, to elect a primary device according to the priorities of the communication control nodes, and to back up its own data in the primary device, that is, to send messages for electing a primary device to the other communication control nodes than the communication control node including the device for electing primary device and data backup among the plurality of communication control nodes, to elect a primary device from the plurality of communication control nodes according to preset priorities of the communication control nodes, and to back up data of the communication control node including the device for electing primary device and data backup, in the primary device; and devices for detecting state and redundancy control each configured to send state detection messages to the communication control nodes, and when a response message of a communication control node to the state detection message is that the communication control node cannot control any action of a device served by the communication control node, to control the action of the device served by the communication control node, and to adjust control intervals of time of signaling lamps at respective junctions in the redundant network according to traffic flows at the respective junctions; and when the response message to the state detection message is a message for electing a primary device, then the communication control node sending the response message which is the message for electing a primary device will control again the action of the device served by the communication control node, and further back up its own data in the primary device, that is, to send state detection messages to the other communication control nodes than the primary device including the state detecting and redundancy control device among the plurality of communication control nodes, and for each of the other communication control nodes than the primary device among the plurality of communication control nodes, when a response message to the state detection message is that the communication control node cannot control any action of a device served by the communication control node, to control the action of the device served by the communication control node, and to adjust control intervals of time of signaling lamps at junctions corresponding to the respective communication control nodes in the redundant network according to traffic flows at the corresponding junctions, and when the response message to the state detection message is a message for electing a primary device, to instruct the communication control node to control again the action of the device served by the communication control node, and to further back up the data of the communication control node in the primary device.

Furthermore the device for electing primary device and data backup includes:

a primary device electing module configured to send the messages for electing a primary device to the other communication control nodes, and to elect the primary device according to manually set flags and traffic transmission states of communication control node in the priorities of the communication control nodes in the messages for electing a primary device, that is, to elect the primary device from the plurality of communication control nodes according to manually set flags and traffic transmission states of communication control node in the preset priorities of the communication control nodes in the messages for electing a primary device;

wherein the primary device electing module configured to elect a communication control node as a primary device when the manually set flag thereof is 1, that is, when there is a manually set flag of 1 in the priority of one of the communication control nodes, to elect the one communication control node as a primary device; and when all the manually set flags are 0, to send state messages of communication control node including a traffic transmission state of communication control node to the other communication control nodes in the redundant network, and to elect a switching device of such a communication control node that there is the lowest communication traffic between the intelligent traffic control center and the communication control node as a primary device, that is, when all the manually set flags in the priorities of the respective communication control nodes are 0, to send state messages of communication control node including a traffic transmission state of the communication control node to the other communication control nodes than the communication control node including the device for electing primary device and data backup among the plurality of communication control nodes, and to elect such a communication control node that there is the lowest communication traffic between the communication control node and the intelligent traffic control center as a primary device.

Furthermore the device for detecting state and redundancy control includes:

a redundancy control module configured to send request messages of junction traffic flow to the communication control nodes, to receive response messages including junction traffic flows of the communication control nodes, and to receive the junction traffic flow information of the respective nodes in the response message, that is, to send request messages of junction traffic flow to the other communication control nodes than the primary device among the plurality of communication control nodes, and to receive response messages including the junction traffic flows of the communication control nodes, wherein each communication control node returns the response message of the communication control node to the request message of junction traffic flow to the primary device; and to shorten or lengthen the control intervals of time of the signaling lamps at the respective junctions according to the junction traffic flow conditions upon reception of such junction traffic flows of the communication control nodes that are above a junction traffic flow threshold, that is, for each of the other communication control nodes than the primary device among the plurality of communication control nodes, to shorten or lengthen the control interval of time of the signaling lamp at the junction corresponding to the communication control node according to the junction traffic flow condition corresponding to the communication control node upon reception of such a junction traffic flow in the response message returned by the communication control node that is above a junction traffic flow threshold corresponding to the communication control node.

Furthermore the device for electing primary device and data backup further includes:

a data backup module configured to back up the data of the communication control node in an adjacent communication control node, that is, to back up the data of the communication control node including the data backup module, in an adjacent communication control node; and the device for detecting state and redundancy control is further configured, when the response message to the state detection message is that the communication control node cannot transmit all the data in the uplink, then the adjacent communication control node will transmit the backup data thereof in the uplink, where the data includes all the data stored in the communication control node, that is, when it is determined that the response message of the communication control node including the data backup module to the state detection message is that the communication control node including the data backup module cannot transmit all the data in the uplink, to instruct the adjacent communication control node to transmit the backup data of the communication control node including the data backup module in the uplink, wherein the data include all the data stored by the communication control node.

Furthermore the state detecting and redundancy control device is configured:

to send request messages of data uplink transmission to the intelligent traffic control center and the communication control node, that is, to send request messages of data uplink transmission to the intelligent traffic control center and the communication control node including the data backup module; and when no response message of the intelligent traffic control center to the request message of data uplink transmission is received in a predetermined period of time, to send request messages of backup data uplink transmission to the respective adjacent communication control nodes of the communication control node, so that the adjacent communication control nodes transmit their stored backup data to the intelligent traffic control center in the uplink, and send response messages to the request messages of backup data uplink transmission to the primary device after completing uplink transmission, that is, when no response message of the intelligent traffic control center to the request message of data uplink transmission is received in the predetermined period of time, to send request messages of backup data uplink transmission to the adjacent communication control nodes, so that the adjacent communication control nodes transmit their stored backup data to the intelligent traffic control center in the uplink, and send response messages to the request messages of backup data uplink transmission to the state detecting and redundancy control device after completing uplink transmission; and the device for detecting state and redundancy control is further configured for the communication control node to transmit its own data to the intelligent traffic control center in the uplink, upon reception of the response message of the intelligent traffic control center to the request message of data uplink transmission in the predetermined period of time, that is, to instruct the communication control node including the data backup module to transmit the data of the communication control node to the intelligent traffic control center in the uplink, upon reception of the response message of the intelligent traffic control center to the request message of data uplink transmission in the predetermined period of time.

The embodiments of the invention provide a method and system for distributed redundancy control on an intelligent traffic network, where the communication control nodes constitute the redundant network; the communication control nodes elect the primary device according to the priorities of the communication control nodes, and back up their own data in the primary device; the primary device sends the failure detection messages to the communication control node, and when the response message of a communication control node to the state detection message is that the communication control node cannot control any action of the device served by the communication control node, then the primary device will take the place of the communication control node to control the action of the device served by the communication control node, and the primary device will adjust the control intervals of time of the signaling lamps at the respective junctions in the redundant network according to the traffic flows at the respective junctions; or when the response message to the state detection message is a message for electing a primary device, then the communication control node sending the response message which is the message for electing a primary device will control again the action of the device served by the communication control node, and further back up its own data in the primary device, so that the adjacent communication control node will transmit the backup data thereof in the uplink, thus enabling distributed redundancy control on the intelligent traffic network.

The foregoing description merely presents a summary of the technical solutions according to the embodiments of the invention, and in order to make the inventive technical solutions more apparent, and enable them to be put into practice according to the disclosure of the description, and in order to make the foregoing and other objects, features and advantages of the invention more apparent and readily understood, particular embodiments of the invention will be exemplified below.

BRIEF DESCRIPTION OF THE DRAWINGS

Various other advantages and benefits of the invention will become apparent to those ordinarily skilled in the art upon review of the following detailed description of preferred embodiments thereof. The drawings are merely intended to illustrate the preferred embodiments of the invention but not intended to limit the scope of the invention. Like reference numerals will denote like components throughout the drawings in which.

DETAILED DESCRIPTION OF THE EMBODIMENTS

Figure 1:
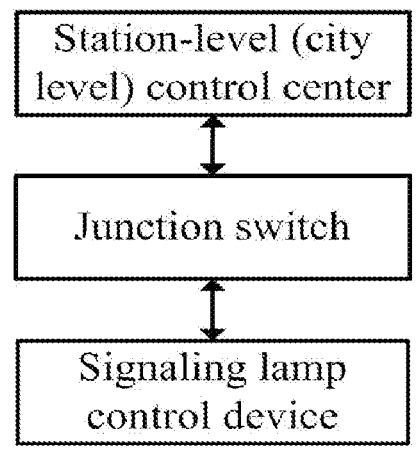
FIG. 1 is a schematic structural diagram of the existing intelligent traffic network.

In order to enable the security, instantaneity, and redundancy of intelligent traffic management, embodiments of the invention provide a method and system for distributed redundancy control on an intelligent traffic network.

Exemplary embodiments of the invention will be described below in further details with reference to the drawings. Although the exemplary embodiments of the invention are illustrated in the drawings, it shall be appreciated that the invention can be embodied in various forms, but will not be limited to the embodiments described here. On the contrary, these embodiments are provided to enable more thorough understanding of the invention, and to enable the scope of the invention to be completely conveyed to those skilled in the art.

The embodiments of the invention will be described below with reference to the drawings.

Figure 2:
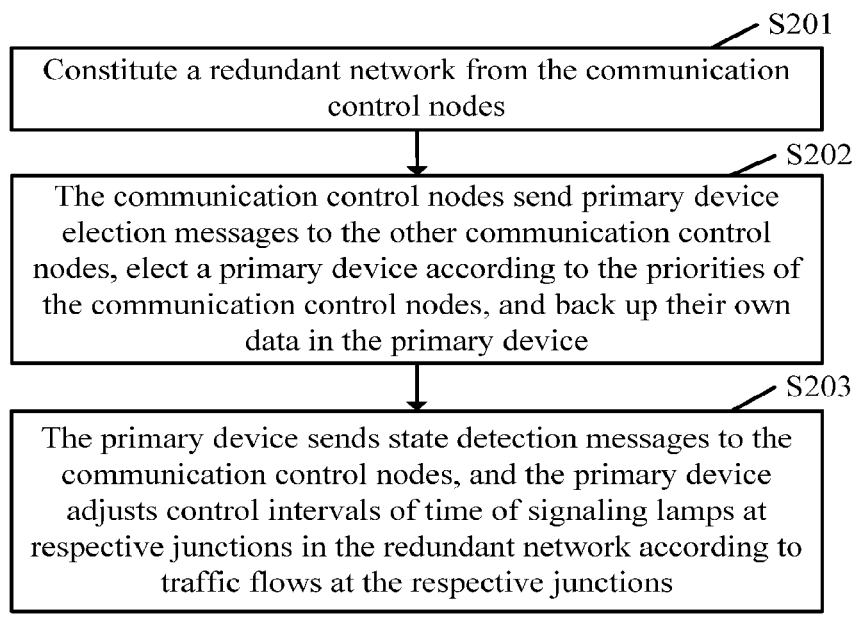
FIG. 2 is a flow chart of a distributed redundancy control process on an intelligent traffic network according to some embodiments of the invention.

FIG. 2 is a distributed redundancy control process on an intelligent traffic network according to some embodiments of the invention, where the intelligent traffic network includes an intelligent traffic control center and communication control nodes, and where the process includes the following steps:

The step S201 is to constitute a redundant network from the communication control nodes.

In the transformation network, a plurality of communication control nodes constitute a redundant network which can include the entire transformation network, or which can be consisted of a plurality of adjacent communication control nodes. In the embodiments of the invention, there are a plurality of communication control nodes, for each of which there is an adjacent communication control node.

In the step S202, the communication control nodes send messages for electing a primary device to the other communication control nodes, and the communication control nodes elect a primary device according to the priorities of the communication control nodes, and back up their own data in the primary device.

In particular, the communication control nodes also receive the messages for electing a primary device sent by the other communication control nodes while sending the messages for electing a primary device to the other communication control nodes, where the communication control nodes send the messages for electing a primary device to the other communication control nodes in the network, that is, each communication control node sends the messages for electing a primary device to the other communication control nodes, where the message for electing a primary device includes the priority of the communication control node, that is, the priorities of the respective communication control nodes are preset in the messages for electing a primary device of the corresponding communication control nodes; and the communication control node elects the primary device from the plurality of communication control nodes according to the preset priorities of the communication control nodes.

In the step S202, the data are backed up in the primary device particularly by transmitting the backup data of the communication control nodes to the primary device for redundant storage after the primary device is elected.

In particular, the message for electing a primary device includes the priority of the communication control node, and particularly a manually set flag and a traffic transmission state of communication control node; and the primary device is further elected by firstly electing the primary device according to the manually set flag, and then electing the primary device according to the traffic transmission state of communication control node.

In the step S203, the primary device sends state detection messages to the communication control nodes, and the primary device adjusts control intervals of time of signaling lamps at respective junctions in the redundant network according to traffic flows at the respective junctions.

In particular, if a response message to the state detection message is that a communication control node cannot control any action of a device served by the communication control node, then the primary device will take the place of the communication control node to control the action of the device served by the communication control node, and the primary device will adjust the control intervals of time of the signaling lamps at the respective junctions in the redundant network according to the traffic flows at the respective junctions. Alternatively if a communication control node does not respond to the state detection message, that is, the failing device (the communication control node) cannot control any action of a device served by the communication control node, then the primary device will take the place of the communication control node to control the action of the device served by the communication control node.

Here the primary device sends the state detection messages to the communication control nodes, that is, the primary device sends the state detection messages to the other communication control nodes than the primary device among the plurality of communication control nodes; and for each of the other communication control nodes than the primary device among the plurality of communication control nodes, if a response message to the state detection message is that a communication control node cannot control any action of a device served by the communication control node, then the primary device will take the place of the communication control node to control the action of the device served by the communication control node, and the primary device will adjust the control intervals of time of the signaling lamps at the respective junctions in the redundant network according to the traffic flows at the respective junctions, that is, if the response message of the communication control node to the state detection message is that the communication control node cannot control any action of the device served by the communication control node, then the primary device will take the place of the communication control node to control the action of the device served by the communication control node, and the primary device will adjust the control intervals of time of the signaling lamps at the corresponding junctions according to the traffic flows at the junctions corresponding to the respective communication control nodes in the redundant network, where one communication control node corresponds to one junction; and if the response message to the state detection message is an message for electing a primary device, then the communication control node sending the response message which is the message for electing a primary device will control again the action of the device served by the communication control node, and to further back up its own data in the primary device, that is, if the response message of the communication control node to the state detection message is an message for electing a primary device, then the communication control node will be instructed to control again the action of the device served by the communication control node, and to further back up the data of the communication control node in the primary device.

In particular, the response message is that the communication control node cannot control any action of the device served by the communication control node, or may be that the communication control node does not respond to the state detection message, that is, the response message of the communication control node to the state detection message is that the communication control node cannot control any action of the device served by the communication control node, or may be that the failing communication control node does not respond to the state detection message; and at this time, the primary device takes the place of the communication control node to control the action of the device served by the communication control node, that is, in the redundant network, the primary device backs up the data of the communication control node, and instructs and controls the device served by the communication control node, that is, if some communication control node fails, then the primary device will take the place of the communication control node to control a device connected with the communication control node, for example, control a signaling lamp. If the response message of the communication control node to the state detection message is an message for electing a primary device, then the communication control node sending the response message which is the message for electing a primary device will control again the action of the device served by the communication control node, and to further back up its own data in the primary device.

In particular, if the primary device detects that the communication control node is in such an operating condition that the communication control node failing to control any action of the device served by the communication control node resumes normality, then the communication control node will send an message for electing a primary device to the primary device as a response message to the state detection message, and the primary device will stop controlling the device served by the communication control node, upon reception of the response message, and the node will control again the device served by the node, that is, the communication control node will control again the action of the device served by the communication control node. Here the controlled action of the device served by the communication control node is to control the signaling lamp.

Figure 3:
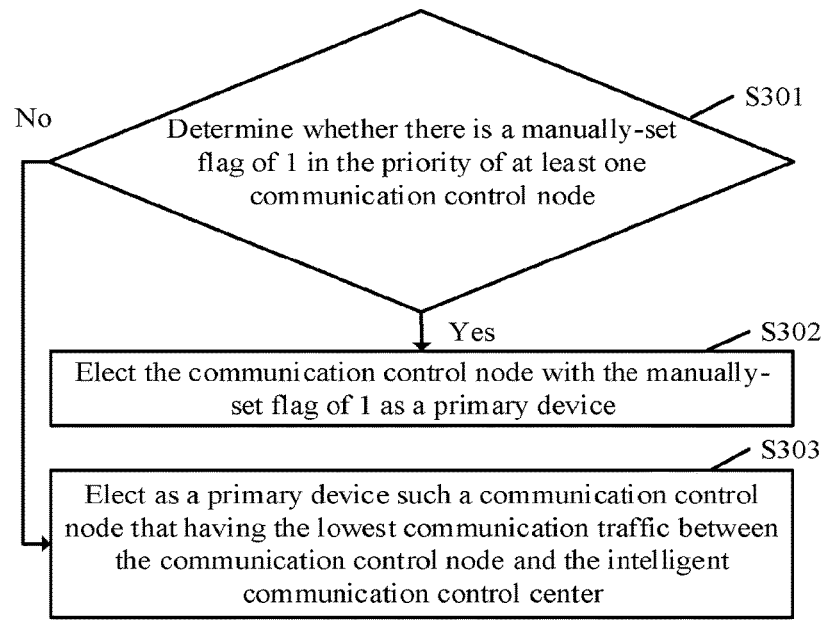
FIG. 3 is a detailed flow chart of communication control nodes electing a primary device according to the priorities of the communication control nodes according to some embodiments of the invention.

FIG. 3 illustrates a detailed flow chart of communication control nodes electing a primary device according to the priorities of the communication control nodes according to some embodiments of the invention, i.e., a flow chart in which the communication control nodes elect the primary device from the plurality of communication control nodes according to the preset priorities of the communication control nodes, and furthermore in order to enable redundancy control in intelligent traffic, in some embodiments, the communication control nodes elect the primary device according to the priorities of the communication control nodes, and back up their own data in their adjacent communication control nodes, where the primary device detects the operating condition of the communication control nodes, so that the communication control nodes send messages for electing a primary device throughout the redundant networks, and the communication control nodes receiving the messages elect one of the communication control nodes as a primary device according to the priorities of the communication control nodes, where they firstly elect the primary device by comparing their manually set flags, and then if the manually set flags are identical, then they will elect the primary device by comparing transmission flows between the communication control nodes and the control center, and selecting the communication control node with the lowest transmission flow, that is, such a communication control node is elected as a primary device that there is the lowest communication traffic between the communication control node and the intelligent traffic control center, primarily because that the primary device controlling redundantly the entire redundant network needs to communicate well with the control center; and finally the primary device notifies the control center of an election result, particularly as follows.

The communication control nodes sends the messages for electing a primary device to the other communication control nodes, and elect the primary device according to the manually set flags and the traffic transmission states of communication control node in the priorities of the communication control nodes in the messages for electing a primary device.

In particular, the communication control nodes send the messages for electing a primary device to the other communication control nodes, that is, for each communication control node, the communication control nodes sends the messages for electing a primary device to the other communication control nodes than the communication control node; and elects the primary device according to the manually set flags and the traffic transmission states of communication control node in the priorities of the communication control nodes in the messages for electing a primary device, that is, elects the primary device from the plurality of communication control nodes according to the manually set flags and the traffic transmission states of communication control node in the preset priorities of the communication control nodes in the messages for electing a primary device, where the communication control node sending the messages for electing a primary device to the other communication control nodes also receives the messages for electing a primary device sent by the other communication control nodes.

Accordingly the primary device is elected from the plurality of communication control nodes particularly as follows: a communication control node is elected as a primary device if the manually set flag thereof is 1; and if all the manually set flags are 0, then the communication control node in the redundant network will send state messages of communication control node including a traffic transmission state of communication control node to the other communication control nodes in the redundant network, and elect as a primary device a switching device of such a communication control node that there is the lowest communication traffic between the intelligent traffic control center and the communication control node.

That is, if there is a manually set flag of 1 in the priority of one of the communication control nodes, then the one communication control node will be elected as a primary device; and if all the manually set flags in the priorities of the respective communication control nodes are 0, then the communication control node will send state messages of communication control node including a traffic transmission state of the communication control node to the other communication control nodes, and elect as a primary device such a communication control node that there is the lowest communication traffic between the communication control node and the intelligent traffic control center, where the switching device of the communication control node is the communication control node.

In some embodiments, the default value of a manually set flag is 0, and if the manually set flag needs to be set to 1, then the manually set flag will be set manually to 1, that is, one of the communication control nodes will be decided manually to be set as a primary device. The manually set flag here will not be limited to the particular example of 1 or 0.

The communication control node elects the primary device from the plurality of communication control nodes according to the preset priorities of the communication control nodes, particularly as follows as illustrated in FIG. 3.

The step S301 is to determine whether there is a manually set flag of 1 in the priority of at least one communication control node, and if so, then the flow will proceed to the step S302; otherwise, the flow will proceed to the step S303.

The step S302 is to elect the communication control node with the manually set flag of 1 as a primary device.

The step S303 is to elect as a primary device such a communication control node that there is the lowest communication traffic between the communication control node and the intelligent communication control center.

It shall be noted that if the failing primary device cannot control redundantly, then the intelligent traffic control center will send a detection message periodically to the primary device, and if the primary device fails to respond to the message, then the intelligent traffic control center will send an instruction to reelect a primary device throughout the redundant network. That is, the intelligent traffic control center sends the detection message periodically to the primary device, and if no response message of the primary device to the detection message is received, then it will be determined that the primary device fails, and the intelligent traffic control center will send the instruction to reelect a primary device throughout the redundant network.

Figure 4:
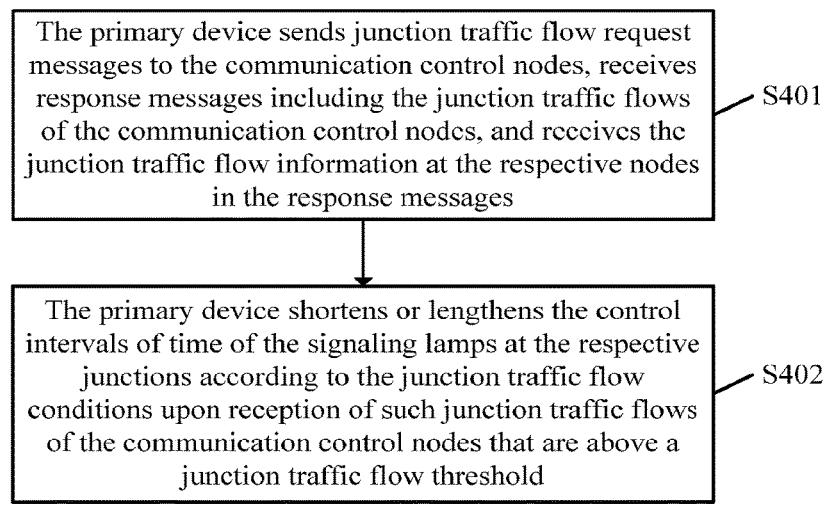
FIG. 4 is a detailed flow chart of adjusting control intervals of time of signaling lamps at respective junctions according to some embodiments of the invention.

FIG. 4 illustrates a detailed flow chart of the primary device adjusting control intervals of time of signaling lamps at respective junctions in the redundant network according to traffic flows at the respective junctions according to some embodiments of the invention, and furthermore in order to ensure the instantaneity of traffic control in intelligent traffic, in some embodiments, if the response message to the state detection message is that the communication control node cannot control any action of the device served by the communication control node, then the primary device will take the place of the communication control node to control the action of the device served by the communication control node, that is, if the response message of the communication control node to the state detection message is that the communication control node cannot control any action of the device served by the communication control node, then the primary device will control the action of the device served by the communication control node, and at this time, the primary device will adjust the control intervals of time of the signaling lamps at the respective junctions in the redundant network according to the traffic flows at the respective junctions, that is, the primary device will adjust the control intervals of time of the signaling lamps at the junctions corresponding to the respective communication control nodes in the redundant network according to the traffic flows at the corresponding junctions, particularly as follows.

In the step S401, the primary device sends request messages for junction traffic flow to the communication control nodes, receives response messages including the junction traffic flows of the communication control nodes, and receives the junction traffic flow information at the respective nodes in the response messages.

That is, if some communication control node fails, then the primary device will receive traffic information of the failing node directly and take place of the failing node to control signal of the device served by the node.

In particular, the primary device sends the request messages of junction traffic flow to the other communication control nodes than the primary device among the plurality of communication control nodes, and receives the response messages including the junction traffic flows of the communication control nodes, where each communication control node sends the response message corresponding to the communication control node to the primary device, that is, returns the response message to the primary device for the request message of junction traffic flow.

In the step S402, the primary device shortens or lengthens the control intervals of time of the signaling lamps at the respective junctions according to the junctions' traffic flow conditions upon reception of such junctions' traffic flows of the communication control nodes that are above a threshold of junction traffic flow.

In particular, for each of the other communication control nodes than the primary device among the plurality of communication control nodes, the primary device shortens or lengthens the control interval of time of the signaling lamp at the junction corresponding to the communication control node according to the junction traffic flow condition corresponding to the communication control node upon reception of such a junction traffic flow in the response message returned by the communication control node that is above a threshold of junction traffic flow corresponding to the communication control node.

Since a traffic jam needs to be addressed as a whole, and at least partially, the control intervals of time of the signaling lamps at the respective junctions need to be shortened or lengthened according to the junction traffic flow conditions.

Furthermore in order to ensure the data is backed up redundantly in intelligent traffic, in some embodiments, the communication control nodes back up their own data in their adjacent communication control nodes, and if the response messages to the state detection messages are that the communication control nodes cannot transmit all the data in the uplink, then their adjacent communication control nodes will transmit their backup data in the uplink, where the data include all the data stored by the communication control nodes, that is, for each communication control node, the communication control node backs up the data of the communication control node in its adjacent communication control node; and if the primary device determines that the response message of the communication control node to the state detection message is that the communication control node cannot transmit all the data in the uplink, then the primary node will instruct the adjacent communication control node to transmit the backup data of the communication control node in the uplink, where the data include all the data stored by the communication control node, and the adjacent communication control node is a communication control node adjacent to the communication control node.

In particular, the communication control node backs up all the data stored by the communication control node in the communication control node adjacent to the communication control node, where the data stored by the communication control node include instruction control data of the device served by the communication control node, but also other service data of the communication control node, e.g., video data, etc.; and if the response message to the state detection message is that the communication control node cannot transmit all the data in the uplink, then the adjacent communication control node will transmit the backup data in the uplink, that is, the adjacent communication control node will transmit in the uplink the backup data of the communication control node failing to transmit the data in the uplink.

Figure 5:
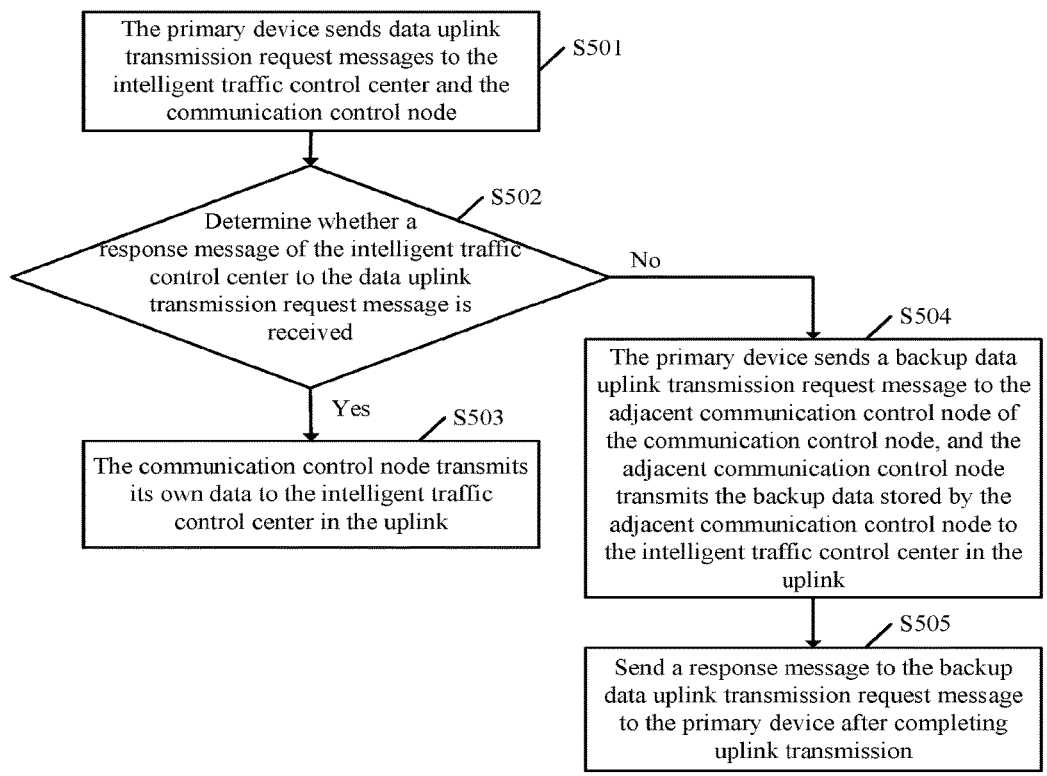
FIG. 5 is a detailed flow chart of uploading backup data by an adjacent communication control node according to some embodiments of the invention.

FIG. 5 illustrates a detailed flow chart of an adjacent communication control node uploading backup data according to some embodiments of the invention, and furthermore in order to ensure the instantaneity and effectiveness of intelligent traffic, in some embodiments, if the response message to the state detection message is that the communication control node cannot transmit all the data in the uplink, then the adjacent communication control node will transmit the backup data thereof.

In the step S501, the primary device sends request messages of data uplink transmission to the intelligent traffic control center and the communication control node.

In particular, the primary device sends the request message of data uplink transmission to the intelligent traffic control center at some interval of time, that is, the primary device sends the request message of data uplink transmission to the intelligent traffic control center at a preset interval of time.

The step S502 is to determine whether a response message of the intelligent traffic control center to the request message of data uplink transmission is received in a predetermined period of time, and if so, then the flow will proceed to the step S503; otherwise, the flow will proceed to the step S504.

In the step S503, the communication control node transmits its own data to the intelligent traffic control center in the uplink.

In particular, if the primary device receives the response message of the intelligent traffic control center to the request message of data uplink transmission in the predetermined period of time, then the communication control node will transmit its own data to the intelligent traffic control center in the uplink. That is, the primary device instructs the communication control node to transmit the data of the communication control node to the intelligent traffic control center in the uplink upon reception of the response message of the intelligent traffic control center to the request message of data uplink transmission in the predetermined period of time.

In the step S504, the primary device sends a request message of backup data uplink transmission to the adjacent communication control node of the communication control node, and the adjacent communication control node transmits the backup data stored by the adjacent communication control node to the intelligent traffic control center in the uplink.

The step S505 is to send a response message to the request message of backup data uplink transmission to the primary device after completing uplink transmission.

If the primary device does not receive any response message of the intelligent traffic control center to the request message of data uplink transmission in the predetermined period of time, then the primary device will send the request message of backup data uplink transmission to the adjacent communication control node of the communication control node, and the adjacent communication control node will transmit the backup data stored by the adjacent communication control node to the intelligent traffic control center in the uplink, and send the response message for the request message of backup data uplink transmission to the primary device after completing uplink transmission, that is, if the primary device does not received any response message of the intelligent traffic control center to the request message of data uplink transmission in the predetermined period of time, then the primary device will send the request message of backup data uplink transmission to the adjacent communication control node; and the adjacent communication control node will transmit the stored backup data to the intelligent traffic control center in the uplink, and send the response message for the request message of backup data uplink transmission to the primary device after completing uplink transmission, where the response message for the request message of backup data uplink transmission indicates that uplink transmission is completed.

Figure 6:
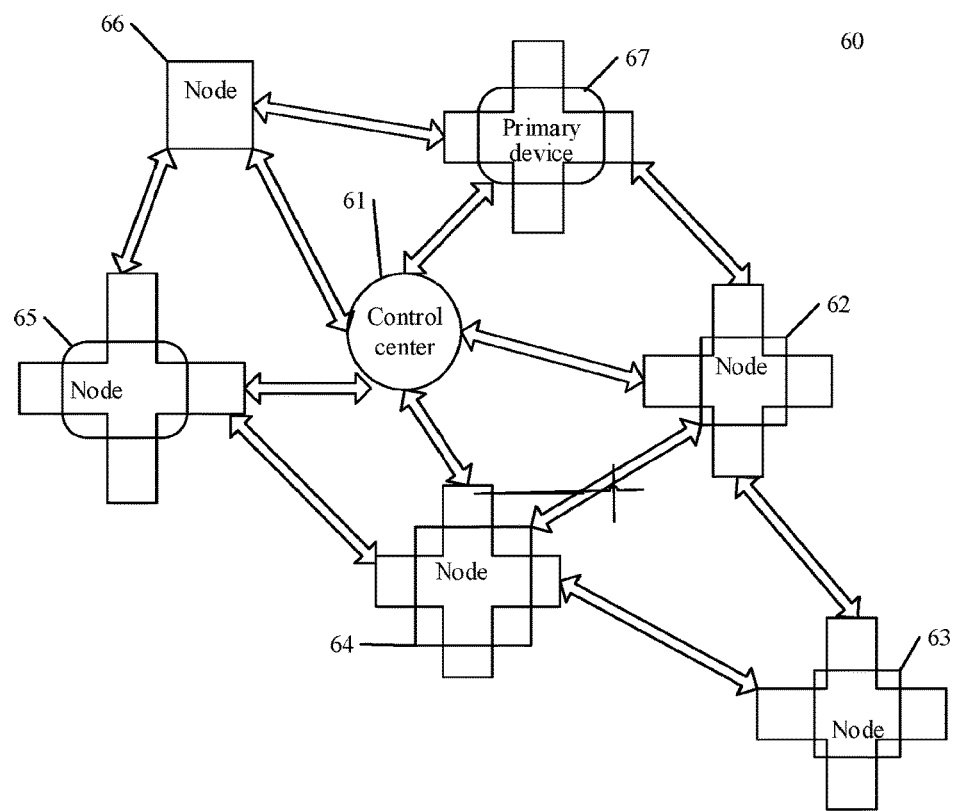
FIG. 6 is a detailed flow chart of distributed redundancy control on an intelligent traffic network according to some embodiments of the invention.

FIG. 6 is a detailed flow chart of distributed redundancy control on an intelligent traffic network according to some embodiments of the invention, and in this embodiment, a redundant network 60 includes communication control nodes 62 to 67, and an intelligent traffic control center 61, where for each of the communication control nodes 62 to 67, the communication control node sends messages for electing a primary device to the other communication control nodes, and elects a primary device according to manually-set flags and traffic transmission states of communication control node in the priorities of the communication control nodes in the messages for electing a primary device of the plurality of communication control nodes; and taking the communication control node 62 as an example, if the manually set flag thereof is 1, then the communication control node 62 will be elected as a primary device.

If all the manually set flags of the communication control nodes 62 to 67 are 0, then the communication control nodes 62 to 67 will each send state messages of that communication control node respectively to the other communication control nodes 62 to 67, that is, for each of the communication control nodes 62 to 67, the communication control node sends a state message of communication control node including a traffic transmission state of communication control node to the other communication control nodes, and elects as a primary device such a communication control node that there is the lowest communication traffic between the communication control node and the intelligent traffic control center 61, for example, if there is the lowest communication traffic between the communication control node 63 and the intelligent traffic control center 61, then the communication control node 63 will be elected as a primary device.

Taking the communication control node 63 as a primary device, the primary device 63 sends request messages of junction traffic flow to the communication control nodes 62 and 64 to 67, and receives response messages including junction traffic flows of the communication control nodes 62 and 64 to 67, that is, receives the response messages of the junction traffic flows returned by the communication control node 62, and the communication control nodes 64 to 67; and receives junction traffic flow information of the corresponding nodes 62 and 64 to 67 in the respective response messages.

The primary device 63 shortens or lengthens control intervals of time of signaling lamps at respective junctions according to the junction traffic flow conditions upon reception of such junction traffic flows of the communication control nodes that are above a threshold of junction traffic flow, that is, for each communication control node, the primary device 63 shortens or lengthens the control interval of time of the signaling lamp at the junction corresponding to the communication control node according to the junction traffic flow condition upon reception of such a junction traffic flow of the communication control node that is above a threshold of junction traffic flow corresponding to the communication control node.

The primary device 63 sends state detection messages to the communication control nodes 62 and 64 to 67.

If a response message of the communication control node 62 to the state detection message is that the communication control node 62 cannot control any action of a device served by the communication control node, then the primary device 63 will take the place of the communication control node 62 to control the action of the device served by the communication control node 62, and the primary device 63 will adjust the control intervals of time of the signaling lamps at the junctions corresponding to the respective communication control nodes 62 to 67 in the redundant network according to the traffic flows at the corresponding junctions, where the device served by the communication control node will not be limited to the signaling lamp at the junction, but can alternatively be a camera, or another electronic device. In particular, the primary device 63 sends request messages of junction traffic flow to the communication control nodes 62 and 64 to 67, receives response messages including junction traffic flows of the respective communication control nodes 62 to 67, and receives junction traffic flow information of the respective nodes 62 to 67 in the response messages.

The primary device 63 shortens or lengthens the control interval of time of the signaling lamp at the junction according to the junction traffic flow condition corresponding to the communication control node 67 upon reception of such a junction traffic flow corresponding to the communication control node 67 that is above a threshold of junction traffic flow corresponding to the communication control node 67, that is, for each communication control node, the primary device 63 shortens or lengthens the control interval of time of the signaling lamp at the junction corresponding to the communication control node according to the junction traffic flow condition upon reception of such a junction traffic flow of the communication control node that is above a threshold of junction traffic flow corresponding to the communication control node.

The communication control node 62 resuming from the failure sends a message for electing a primary device to the primary device 63, and the primary device 63 stops its control on the device served by the communication control node 62, so that the communication control node 62 controls the device served by the communication control node 62.

If the primary device is the communication control node 63, then a secured login mechanism can be further arranged, so that the logging primary device 63 can preset and adjust uniformly the control intervals of time of the signaling lamps at the junctions corresponding to the respective communication control nodes 62 to 67.

In another example where data are backed up redundantly, if the response message of the communication control node 67 to the state detection message is that the communication control node cannot transmit all the data in the uplink, then the adjacent communication control nodes 62 and 66 will transmit backup data of the communication control node 67 in the uplink, so the method further includes:

The primary device 63 sends request messages of data uplink transmission to the intelligent traffic control center 61 and the communication control node 67.

If the primary device 63 receives a response message of the intelligent traffic control center 61 to the request message of data uplink transmission in a predetermined period of time, then the communication control node 67 will transmit its own data to the intelligent traffic control center in the uplink.

If the primary device 63 does not receive any response message of the intelligent traffic control center 61 to the request message of data uplink transmission in the predetermined period of time, then the primary device 63 will send request messages of backup data uplink transmission to the respective adjacent communication control nodes 62 and 66 of the communication control node 67, and the adjacent communication control nodes 62 and 66 will transmit their stored backup data of the communication control node 67 to the intelligent traffic control center 61 in the uplink, and send response messages for the request messages of backup data uplink transmission to the primary device 63 after completing uplink transmission.

Figure 7:
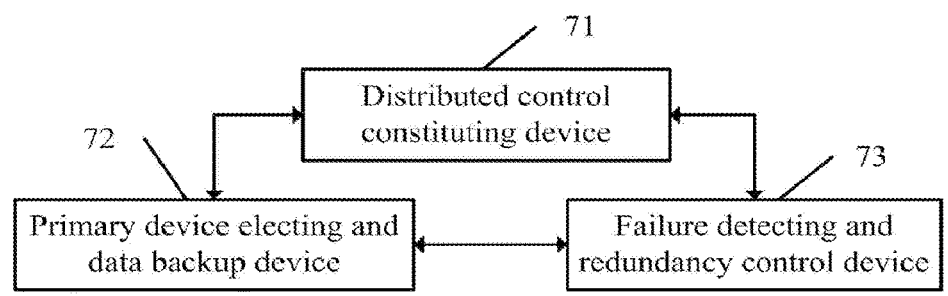
FIG. 7 is a first schematic diagram of a system for distributed redundancy control on an intelligent traffic network according to some embodiments of the invention.

FIG. 7 illustrates a schematic diagram of a system for distributed redundancy control on an intelligent traffic network according to some embodiments of the invention.

There is a system for distributed redundancy control on an intelligent traffic network including an intelligent traffic control center and a plurality of communication control nodes, and as illustrated in FIG. 7, the system includes:

A distributed control constituting device 71 is configured to constitute a redundant network from the communication control nodes, that is, to constitute the redundant network from the plurality of communication control nodes.

A device 72 for electing primary device and data backup is configured to send messages for electing a primary device to the other communication control nodes, to elect a primary device according to the priorities of the communication control nodes, and to back up their own data in the primary device.

In particular, each device 72 for electing primary device and data backup of each communication control node is configured to send the messages for electing a primary device to the other communication control nodes, to elect the primary device from the plurality of communication control nodes according to the preset priorities of the communication control nodes, and to back up data of the communication control node to which the device for electing primary device and data backup belongs, in the primary device, where each communication control node includes a device for electing primary device and data backup, and if the communication control node is not a primary device, then the device for electing primary device and data backup in this communication control node will operate accordingly.

A device 73 for detecting state and redundancy control is configured to send state detection messages to the communication control nodes, and if a response message of a communication control node to the state detection message is that the communication control node cannot control any action of a device served by the communication control node, to control the action of the device served by the communication control node, and to adjust control intervals of time of signaling lamps at respective junctions in the redundant network according to traffic flows at the respective junctions; and if the response message to the state detection message is a primary device election message, then to make the communication control node sending the response message which is the primary device election message control again the action of the device served by the communication control node, and further back up data of the communication control node in the primary device.

In particular, the device for detecting state and redundancy control is configured to send the state detection messages to the other communication control nodes than the primary device including device for detecting state and redundancy control among the plurality of communication control nodes, and for each of the other communication control nodes than the primary device among the plurality of communication control nodes, if the response message to the state detection message is that the communication control node cannot control any action of the device served by the communication control node, to control the action of the device served by the communication control node, and to adjust the control intervals of time of the signaling lamps at the junctions corresponding to the respective communication control nodes in the redundant network according to the traffic flows at the corresponding junctions, and if the response message to the state detection message is a message for electing a primary device, to instruct the communication control node to control again the action of the device served by the communication control node, and to instruct the communication control node further back up the data of the communication control node in the primary device, where each communication control node includes a device for detecting state and redundancy control, and if the communication control node is a primary device, then the device for detecting state and redundancy control in the communication control node will operate accordingly.

Figure 8:
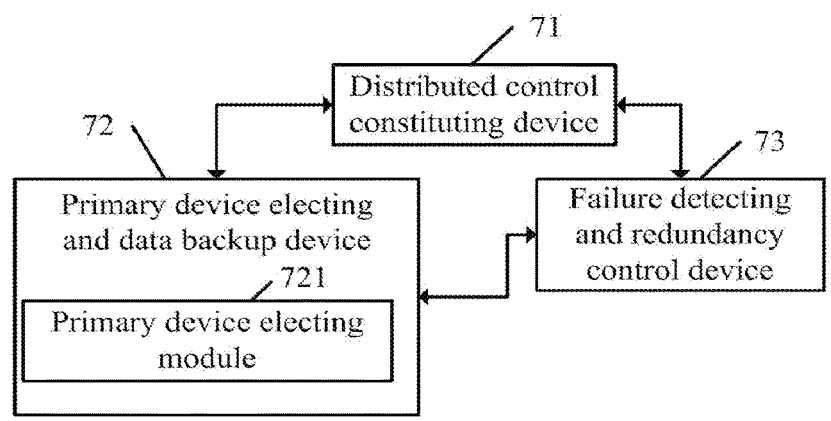
FIG. 8 is a second schematic diagram of components in a system for distributed redundancy control on an intelligent traffic network according to some embodiments of the invention.

As illustrated in FIG. 8, the device 72 for electing primary device and data backup particularly includes:

A primary device electing module 721 is configured to send the messages for electing a primary device to the other communication control nodes, and to elect the primary device according to manually set flags and traffic transmission states of communication control node in the priorities of the communication control nodes in the messages for electing a primary device, where the primary device electing module is configured to elect a communication control node as a primary device if the manually set flag thereof is 1; and if all the manually set flags are 0, to send communication control node state messages including a traffic transmission state of communication control node to the other communication control nodes in the redundant network, and to elect a switching device of such a communication control node that there is the lowest communication traffic between the intelligent traffic control center and the communication control node, as a primary device.

In particular, the primary device electing module is configured to elect the primary device from the plurality of communication control nodes according to the manually set flags and the traffic transmission states of communication control node in the preset priorities of the communication control nodes in the messages for electing a primary device;

Where the primary device electing module configured to elect the primary device from the plurality of communication control nodes is configured:

If there is a manually set flag of 1 in the priority of one of the communication control nodes, to elect the one communication control node as a primary device; and If all the manually set flags in the priorities of the respective communication control nodes are 0, to send the communication control node state messages including the traffic transmission state of the communication control node to the other communication control nodes, and to elect a communication control node that there is the lowest communication traffic between the communication control node and the intelligent traffic control center as a primary device.

Figure 9:
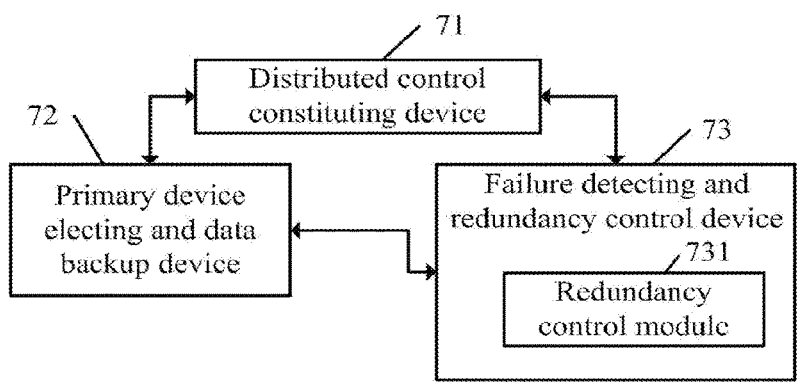
FIG. 9 is a third schematic diagram of components in a system for distributed redundancy control on an intelligent traffic network according to some embodiments of the invention.

As illustrated in FIG. 9, the device 73 for detecting state and redundancy control further includes:

A redundancy control module 731 is configured to send request messages of junction traffic flow to the communication control nodes, to receive response messages including junction traffic flows of the communication control nodes, and to receive the junction traffic flow information of the respective nodes in the response messages; and to shorten or lengthen the control intervals of time of the signaling lamps at the respective junctions according to the junction traffic flow conditions upon reception of such junction traffic flows of the communication control nodes that are above a threshold of junction traffic flow.

In particular, the redundancy control module is configured to send the request messages of junction traffic flow to the other communication control nodes than the primary device among the plurality of communication control nodes, and to receive the response messages including the junction traffic flows of the communication control nodes, where each communication control node returns the response message of the communication control node to the request message of junction traffic flow to the primary device; and for each of the other communication control nodes than the primary device among the plurality of communication control nodes, to shorten or lengthen the control interval of time of the signaling lamp at the junction corresponding to the communication control node according to the junction traffic flow condition corresponding to the communication control node upon reception of such a junction traffic flow in the response message returned by the communication control node that is above a threshold of junction traffic flow corresponding to the communication control node.

Figure 10:
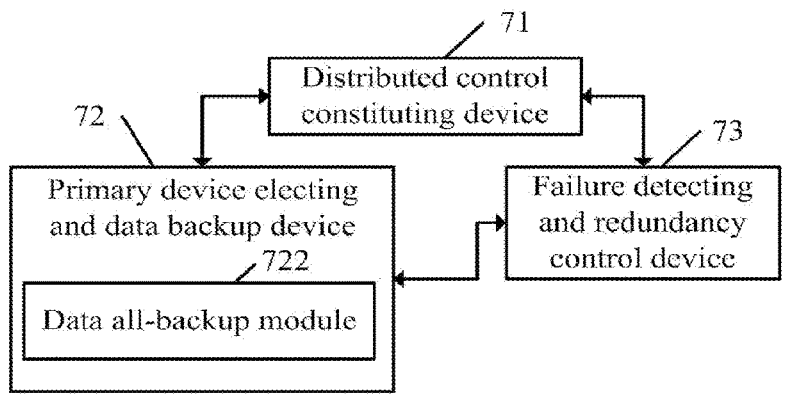
FIG. 10 is a fourth schematic diagram of components in a system for distributed redundancy control on an intelligent traffic network according to some embodiments of the invention.

As illustrated in FIG. 10, the device 72 for electing primary device and data backup further includes:

A data backup module 722 is configured to back up the data of the communication control node in an adjacent communication control node, where if the response message to the state detection message is that the communication control node cannot transmit the data in the uplink, then the adjacent communication control node will transmit the backup data of the communication control node in the uplink, where the data includes all the data stored by the communication control node.

In particular, the data backup module is configured to back up the data of the communication control node including the data backup module, in the adjacent communication control node; and the device for detecting state and redundancy control is further configured, if it is determined that the response message of the communication control node including the data backup module to the state detection message is that the communication control node including the data backup module cannot transmit all the data in the uplink, to instruct the adjacent communication control node to transmit the backup data of the communication control node including the data backup module in the uplink, where the data include all the data stored by the communication control node.

The device 73 for detecting state and redundancy control is configured:

To send request messages of data uplink transmission to the intelligent traffic control center and the communication control node; if a response message of the intelligent traffic control center to the request message of data uplink transmission is received in a predetermined period of time, to transmit data of the communication control node including the device 73 to the intelligent traffic control center in the uplink; and if no response message of the intelligent traffic control center to the request message of data uplink transmission is received in the predetermined period of time, to send request messages of backup data uplink transmission to the respective adjacent communication control nodes of the communication control node, so that the adjacent communication control nodes transmit their stored backup data of the communication control node to the intelligent traffic control center in the uplink, and send response messages to the request messages of backup data uplink transmission to the primary device after completing uplink transmission.

That is, the device for detecting state and redundancy control is configured:

To send the request messages of data uplink transmission to the intelligent traffic control center and the communication control node including the data backup module; and if no response message of the intelligent traffic control center to the request message of data uplink transmission is received in the predetermined period of time, to send the request messages of backup data uplink transmission to the adjacent communication control nodes, so that the adjacent communication control nodes transmit their stored backup data of the communication control node to the intelligent traffic control center in the uplink, and send the response messages to the request messages of backup data uplink transmission to the device for detecting state and redundancy control after completing uplink transmission.

The device for detecting state and redundancy control is further configured to instruct the communication control node including the data backup module to transmit the data of the communication control node to the intelligent traffic control center in the uplink, upon reception of the response message of the intelligent traffic control center to the request message of data uplink transmission in the predetermined period of time.

A method and system for distributed redundancy control on an intelligent traffic network according to the embodiments of the invention achieve the following advantageous effects: the communication control nodes constitute the redundant network; the communication control nodes elect the primary device according to the priorities of the communication control nodes, and back up their own data in the primary device; the primary device sends the failure detection messages to the communication control node, and if the response message of a communication control node to the state detection message is that the communication control node cannot control any action of the device served by the communication control node, then the primary device will take the place of the communication control node to control the action of the device served by the communication control node, and the primary device will adjust the control intervals of time of the signaling lamps at the respective junctions in the redundant network according to the traffic flows at the respective junctions; or if the response message to the state detection message is a message for electing a primary device, then the communication control node sending the response message which is the message for electing a primary device will control again the action of the device served by the communication control node, and further back up its own data in the primary device, so that the adjacent communication control node will transmit the backup data thereof in the uplink, thus enabling distributed redundancy control on the intelligent traffic network.

The algorithm and the display provided here are not inherently relevant to any particular computer, virtual system or another device. Various general-purpose systems can also be used together based upon the teaching here. A structure required to embody the systems will be apparent from the description above. Moreover the invention is not specific to any particular programming language. It shall be appreciated that the disclosure of the invention described here can be embodied using various programming languages, and the description above given for the particular language is intended to disclose the best mode of the invention.

Numerous details have been described in the description provided here. However it can be appreciated that the embodiments of the invention can be put into practice without these particular details. Well-known methods, structures and technologies have not been described in details in some instances so as not to obscure understanding of the description.

Similarly it shall be appreciated that in order to simplify the disclosure and facilitate understanding one or more of the respective aspects of the invention, the respective features of the invention are sometimes grouped together into an embodiment, a figure, or the description thereof, throughout the description above of the exemplary embodiments of the invention. However the method disclosed here shall not be construed as reflecting such an intension that the invention as claimed requires more features than those expressively recited in the respective claims. More exactly, as reflected in the appended claims, the aspects of the invention lie in fewer than all the features in the respective embodiments disclosed above. Thus the claims complying with the particular embodiments are hereby incorporated expressively into the particular embodiments, where the respective claims per se are separate embodiments of the invention.

Those skilled in the art can appreciate that the modules in the device in the embodiments can be adapted, and arranged in one or more devices different from that in the embodiments. The modules or units or components in the embodiments can be combined into a module or unit or component, and moreover they can be separated into sub-modules or sub-units or sub-components. Unless a least some of the features and/or processes or units are mutually exclusive, the respective features disclosed in the specification (including the appended claims, the abstract, and the drawings), and the respective processes or units of any method or device disclosed as such can be applied in any combination. Unless expressively stated otherwise, the respective features disclosed in the specification (including the appended claims, the abstract, and the drawings) can be replaced by alternative features achieving the same, equivalent or similar purpose.

Moreover those skilled in the art can appreciate that some embodiments here include some features in the other embodiments instead of the other features thereof, the features of the different embodiments can be combined in further different embodiments without departing from the scope of the invention. For example, any one of the embodiments claimed in the appended claims can be applied in any combination.

The respective components in the embodiments of the invention can be embodied in hardware, or in software modules operating on one or more processors, or in a combination thereof. Those skilled in the art shall appreciate that some or all of the functions of some or all of the components in the system for distributed redundancy control on an intelligent traffic network according to the embodiments of the invention can be performed in practice by a microprocessor or a Digital Signal Processor (DSP). The invention can alternatively be embodied as a device or apparatus program for performing a part or all of the method described here (e.g., a computer program and a computer program product). Such a program in which the invention is embodied can be stored on a computer readable medium, or can be embodied in the form of one or more signals. Such a signal or signals can be downloaded from an Internet web site, or can be available over a carrier signal, or can be provided in any other form.

It shall be noted that the embodiments above are intended to illustrate but not to limit the invention, and those skilled in the art can devise alternative embodiments without departing from the scope of the appended claims. Any reference numerals placed in the parentheses in the claims shall not be construed as limiting the claims. The term "comprising" will not preclude the presence of an element or a step which is not listed in the other claim(s). "A" or "an" preceding an element will not preclude the presence of a plurality of such elements. The invention can be embodied in hardware including several different elements, plus an appropriately programmed computer. In a device claim listing several units, several of these units can be embodied particularly as the same item of hardware. The use of the terms "first", "second", "third", etc., is not intended to suggest any order. These terms can be constructed as referring to names.

Evidently those skilled in the art can make various modifications and variations to the invention without departing from the spirit and scope of the invention. Accordingly the invention is also intended to encompass these modifications and variations thereto so long as the modifications and variations come into the scope of the claims appended to the invention and their equivalents.

The invention claimed is:

1. A method for distributed redundancy control on an intelligent traffic network comprising an intelligent traffic control center and a plurality of communication control nodes constituting a redundant network, wherein the method comprises:

for each of the communication control nodes, sending, by a communication control node, messages for electing a primary device to the other communication control nodes than the communication control node among the plurality of communication control nodes, and electing a primary device from the plurality of communication control nodes according to preset priorities of the communication control nodes, and backing up data of the communication control node in the primary device; and sending, by the primary device, state detection messages to the other communication control nodes than the primary device among the plurality of communication control nodes, and for each of the other communication control nodes than the primary device among the plurality of communication control nodes, when a response message sent by the communication control node to respond to the state detection message indicates that the communication control node can-not control any action of a device served by the communication control node, then controlling the action of the device served by the communication control node, and adjusting, by the primary device, control intervals of time of signaling lamps at junctions corresponding to the respective communication control nodes in the redundant network according to traffic flows at the junctions; and when the response message is a message for electing a primary device, then instructing the communication control node to control again the action of the device served by the communication control node, and further backing up the data of the communication control node in the primary device;

the data of the communication control node comprises instruction control data of devices served by the communication control node; the action of the device served by the communication control node is a control for a signaling lamp.

2. The method according to claim 1, wherein the electing the primary device from the plurality of communication control nodes according to the preset priorities of the communication control nodes comprises:

electing the primary device from the plurality of communication control nodes according to manually set flags and traffic transmission states of the respective communication control nodes in the preset priorities of the communication control nodes in the messages for electing a primary device;

wherein electing the primary device from the plurality of communication control nodes comprises:

when there is a manually set flag of 1 in the priority of one of the communication control nodes, then electing the one communication control node as the primary device; and when all the manually set flags in the priorities of the respective communication control nodes are 0, then sending, by a given communication control node, state messages of that communication control node to the other communication control nodes than the communication control node among the plurality of communication control nodes, and electing such a communication control node having the lowest communication traffic between the given communication control node and the intelligent traffic control center as a primary device;

wherein each of the state messages comprises a traffic transmission state of the given communication control node.

3. The method according to claim 1, wherein adjusting, by the primary device, control intervals of time of the signaling lamps at the junctions corresponding to the respective communication control nodes in the redundant network according to the traffic flows at the junctions comprises:

sending, by the primary device, request messages of junction traffic flow to the other communication control nodes than the primary device among the plurality of communication control nodes, and receiving response messages comprising the junction traffic flows of the other communication control nodes, wherein each of the other communication control nodes returns a response message of the communication control node to the request message of junction traffic flow to the primary device; and for each of the other communication control nodes than the primary device among the plurality of communication control nodes, shortening or lengthening, by the primary device, the control interval of time of the signaling lamp at the junction corresponding to the communication control node according to a junction traffic flow condition corresponding to the communication control node upon reception of such a junction traffic flow in the response message that is above a junction traffic flow threshold corresponding to the communication control node.

4. The method according to claim 1, wherein the method further comprises:

for each of the communication control nodes, backing up, by the communication control node, the data of the communication control node in an adjacent communication control node; and instructing, by the primary device, the adjacent communication control node to transmit the backup data of the communication control node in a uplink of the redundancy network, upon determining that the response message responding to the state detection message indicates that the communication control node can-not transmit the data in the uplink, wherein the data comprise all data stored in the communication control node.

5. The method according to claim 4, wherein instructing, by the primary device, the adjacent communication control node to transmit the backup data of the communication control node in the uplink, upon determining that the response message responding to the state detection message indicates that the communication control node can-not transmit the data in the uplink comprises:

sending, by the primary device, request messages of data uplink transmission in the redundancy network, to the intelligent traffic control center and the communication control node;

when the primary device does not receive any response message from the intelligent traffic control center to the request message of the data uplink transmission in the redundancy network in a predetermined period of time, then sending a request message of backup data uplink transmission in the redundancy network to the adjacent communication control node; and transmitting, by the adjacent communication control node, stored backup data to the intelligent traffic control center in the uplink, and sending a response message responding to the request message of the backup data uplink transmission in the redundancy network to the primary device after completing the data uplink transmission; and the method further comprises:

instructing, by the primary device, the communication control node to transmit the backup data of the communication control node to the intelligent traffic control center in the uplink, upon reception of a response message from the intelligent traffic control center to the message of data uplink transmission request in the predetermined period of time.

6. A system for distributed redundancy control on an intelligent traffic network comprising an intelligent traffic control center and a plurality of communication control nodes, wherein the system comprises:

a distributed control device configured to constitute a redundant network from the plurality of communication control nodes;

electing devices, each one of the electing devices configured to send messages for electing a primary device to the other communication control nodes than a communication control node comprising the one of the electing devices among the plurality of communication control nodes, to elect a primary device from the plurality of communication control nodes according to preset priorities of the communication control nodes, and to back up data of the communication control node in the primary device; and detecting devices, each one of the detecting devices configured to send state detection messages to the other communication control nodes than a primary device among the plurality of communication control nodes, and for each of the other communication control nodes than the primary device among the plurality of communication control nodes, when a response message responding to the state detection message indicates that the communication control node can-not control any action of a device served by the communication control node, to control the action of the device served by the communication control node, and to adjust control intervals of time of signaling lamps at junctions corresponding to the respective communication control nodes in the redundant network according to traffic flows at the corresponding junctions, and when the response message is a message for electing a primary device, to instruct the communication control node to control again the action of the device served by the communication control node, and to further back up the data of the communication control node in the primary device;

wherein the electing devices and the detecting devices are components of each of the communication control nodes; the data of the communication control node comprises instruction control data of devices served by the communication control node;

the action of the device served by the communication control node is a control for a signaling lamp.

7. The system according to claim 6, wherein each of the electing devices comprises:

a primary device electing module configured to elect the primary device from the plurality of communication control nodes according to manually set flags and traffic transmission states of the respective communication control nodes in the preset priorities of the communication control nodes in the messages for electing a primary device;

wherein the primary device electing module configured to elect the primary device from the plurality of communication control nodes is configured:

when there is a manually set flag of 1 in the priority of one of the communication control nodes, to elect the one communication control node as a primary device; and when all manually set flags in the priorities of the respective communication control nodes are 0, to send state messages of a given communication control node to the other communication control nodes than the communication control node comprising the one of the electing devices among the plurality of communication control nodes, and to elect such a communication control node having the lowest communication traffic between the given communication control node and the intelligent traffic control center as a primary device;

wherein each of the state messages comprises a traffic transmission state of the given communication control node.

8. The system according to claim 6, wherein the state detecting and redundancy control device comprises:
a redundancy control module configured to send request messages of junction traffic flow to the other communication control nodes than the primary device among the plurality of communication control nodes, and to receive response messages comprising junction traffic flows of the other communication control nodes, wherein each of the other communication control nodes returns the response message responding to the request message of junction traffic flow to the primary device; and
the redundancy control module further configured, for each of the other communication control nodes than the primary device among the plurality of communication control nodes, to shorten or lengthen the control interval of time of the signaling lamp at the junction corresponding to the communication control node according to the junction traffic flow condition corresponding to the communication control node upon reception of such a junction traffic flow in the response message returned by the communication control node that is above a junction traffic flow threshold corresponding to the communication control node.

9. The system according to claim 6, wherein each of the electing devices further comprises:
a data backup module configured to back up data of the communication control node comprising this data backup module, in adjacent communication control nodes; and
each of the detecting devices is further configured, when it is determined that the response message of the communication control node comprising the data backup module to the state detection message indicates that the communication control node comprising the data backup module can-not transmit all the data in a uplink of the redundant network, to instruct the adjacent communication control node to transmit the backup data of the communication control node comprising the data backup module in the uplink, wherein the data comprise all data stored in the communication control node.

10. The system according to claim 9, wherein each of the detecting devices is configured:
to send request messages of data uplink transmission to the intelligent traffic control center and the communication control node comprising the data backup module; and
when no response message from the intelligent traffic control center to the request message of data uplink transmission in the redundancy network is received in a predetermined period of time, to send request messages of the backup data uplink transmission in the redundancy network to the adjacent communication control nodes; and
to instruct the adjacent communication control nodes to transmit their stored backup data to the intelligent traffic control center in the uplink, and send response messages responding to the request messages of the backup data uplink transmission in the redundancy network to the detecting device after completing uplink transmission; and
the detecting device is further configured to instruct the communication control node comprising the data backup module to transmit the data of the communication control node to the intelligent traffic control center in the uplink, upon reception of the response message from the intelligent traffic control center to the request message of data uplink transmission in the predetermined period of time.

* * * * *